(12) United States Patent
Whitley et al.

(10) Patent No.: US 9,426,243 B2
(45) Date of Patent: Aug. 23, 2016

(54) REMOTE CONTEXTUAL COLLABORATION

(71) Applicant: Schlumberger Technology Corporation, Sugar Land, TX (US)

(72) Inventors: Stephen Whitley, Katy, TX (US); Floyd Louis Broussard, III, The Woodlands, TX (US); Scott Trevor Raphael, Houston, TX (US); Patrick Dineen, Katy, TX (US); Horacio Ricardo Bouzas, Oslo (NO); Cyril Laroche-Py, Houston, TX (US); Chad Brockman, Cypress, TX (US); Vignesh Venkataraman, Houston, TX (US); Brandon David Plost, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 217 days.

(21) Appl. No.: 14/137,057

(22) Filed: Dec. 20, 2013

(65) Prior Publication Data

US 2014/0189011 A1 Jul. 3, 2014

Related U.S. Application Data

(60) Provisional application No. 61/746,437, filed on Dec. 27, 2012.

(51) Int. Cl.
| | |
|---|---|
| *H04L 29/08* | (2006.01) |
| *G06Q 10/10* | (2012.01) |
| *H04L 29/06* | (2006.01) |
| *G06F 17/30* | (2006.01) |

(52) U.S. Cl.
CPC ............. *H04L 67/26* (2013.01); *G06F 17/30* (2013.01); *G06Q 10/101* (2013.01); *H04L 65/40* (2013.01)

(58) Field of Classification Search
CPC .. H04L 67/16–67/26; G06F 17/30–17/30705; G06Q 10/101–10/103
See application file for complete search history.

(56) References Cited

U.S. PATENT DOCUMENTS

| | | | |
|---|---|---|---|
| 2010/0235002 A1* | 9/2010 | Dufilho | B01D 33/0315 700/275 |
| 2012/0278090 A1* | 11/2012 | Frankfort | G06Q 10/06 705/1.1 |
| 2013/0091229 A1* | 4/2013 | Dunn | G06Q 50/01 709/206 |
| 2013/0138671 A1* | 5/2013 | Cleaver | G06Q 10/101 707/758 |
| 2015/0160101 A1* | 6/2015 | Gao | G01M 13/028 702/6 |

\* cited by examiner

*Primary Examiner* — Nicholas Taylor
*Assistant Examiner* — Clayton R Williams
(74) *Attorney, Agent, or Firm* — Colin L. Wier; Rodney Warfford; Alec McGinn

(57) ABSTRACT

A method for remote collaboration includes receiving posting content from a first employee of a company. The posting content includes a multitude of key terms. The method further includes generating a first employee posting using the posting content, extracting the multitude of key terms from the posting content, matching one of the plurality of key terms to a key term label, storing the key term label in the first employee posting, and selecting a company channel corresponding to the key terms label. The method further includes identifying a subscriber of the company channel, where the subscriber is a second employee of the company, and presenting the first employee posting content to the subscriber.

14 Claims, 8 Drawing Sheets

REMOTE CONTEXTUAL COLLABORATION

CROSS-REFERENCE TO RELATED APPLICATIONS

This application claims benefit under 35 U.S.C. §119(e) of U.S. Provisional Patent Application No. 61/746,437, filed on Dec. 27, 2012, and entitled "Remote Contextual Collaboration", which is hereby incorporated by reference.

BACKGROUND

Large companies often include many divisions and many different types of employees. Such companies often employ large and complicated software systems to facilitate communication between employees. However, most communication software for companies is primarily used for one-to-one communication or is designed such that messages sent by employees are directed to the recipients designated by the employee. Further, most employees interact exclusively with other employees in their division or directly related divisions.

SUMMARY

In general, in one embodiment, aspects relate to a method for remote collaboration. The method includes receiving posting content from a first employee of a company, wherein the posting content comprises a plurality of key terms, generating a first employee posting using the posting content, and extracting the plurality of key terms from the posting content. The method further includes matching one of the plurality of key terms to a key term label, storing the key term label in the first employee posting, and selecting a company channel corresponding to the key terms label. The method further includes identifying a subscriber of the company channel, wherein the subscriber is a second employee of the company, and presenting the first employee posting content to the subscriber. Other aspects will be apparent from the following description and the appended claims.

DETAILED DESCRIPTION

Figure 1:
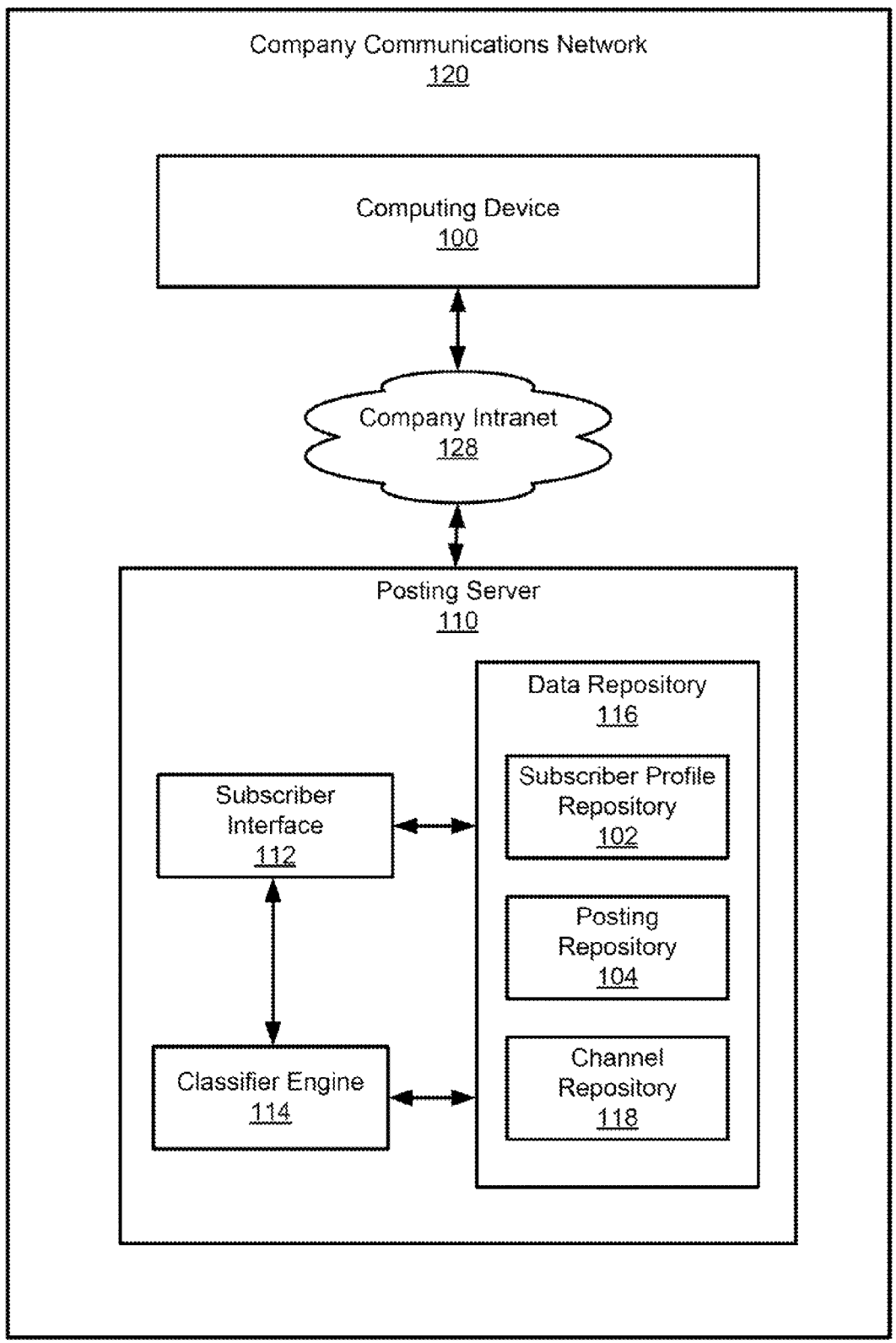
FIGS. 1-4 show systems in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a method and system for a remote collaboration. Specifically, embodiments may be used to facilitate intra-company communication and to exchange unverified information enabling employees of the company to make useful inferences based on the exchanged information. Embodiments may be used to receive unverified information, store the unverified information with key term labels and context labels, and provide the unverified information to subscribers based on the key terms labels and context labels.

FIG. 1 shows a system in one or more embodiments. The system includes a company communications network (120) that includes a computing device (100) and a posting server (110) communicatively connected by a company intranet (128). The computing device (100) is any type of device or collection of devices that includes functionality to process instructions and present information to a subscriber. Specifically, the subscriber may be an employee submitting the unverified information as a posting and/or an employee that subscribes to postings. The computing device (100) may be a system that includes functionality to self-create postings without employee interaction. For example, the computing device (100) may be a personal computer, a laptop, a desktop, a server, a surface unit, a mobile device (e.g., mobile phone, tablet, or any other mobile device), oilfield equipment, a sensor, and/or any other device for performing operations.

The computing system (100) is operatively connected to a posting server (110) via company intranet (128). The posting server (110) includes a subscriber interface (112), a classifier engine (114), and a server data repository (116). Each of these components is presented below.

In one or more embodiments, the subscriber interface (112) includes functionality to interact with the subscriber. Specifically, the subscriber interface (112) includes functionality to receive subscription terms and present the postings. The subscriber interface (112) may include a website, a text messaging service, and/or other software and/or hardware for content collaboration. Further, the subscriber interface (112) may include access limitations such that limit access to employees and/or authorized personal for the postings stored in the data repository (116). Further, the subscriber interface (112) may include security limiting access to employees of the company. In one or more embodiments, accessing the subscriber interface (112) may include submitting information to authenticate the subscriber as an employee of the company.

In one or more embodiments, the data repository (116) is any type of storage unit and/or device (e.g., a file system, database, collection of tables, or any other storage mechanism) for storing data. Further, the data repository (116) may include multiple different storage units and/or devices. The multiple different storage units and/or devices may or may not be of the same type or located at the same physical site.

In one or more embodiments, the data repository (116) includes functionality to store a subscriber profile (102), postings repository (104), and channel repository (118). In one or more embodiments, the postings repository (104) stores the postings that are presented to subscribers of the posting's labels. A posting is an electronic message that is sent to subscribers of a newsgroup. In one or more embodiments, each posting includes posting content and labels used to associate one posting with other potentially related postings. Further detail about postings is provided below in reference to FIG. 2.

The subscriber profile (102) corresponds to information about a subscriber. In one or more embodiments, the profile may include personal data of the subscriber, business data (e.g., current projects, current position), or any other data related to the subscriber. The profile (102) may specify data the subscriber may be interested to receive. For example, a subscriber profile may include subscription terms for a company channel, location of the subscriber, employment position of the subscriber, communication preferences (e.g., mode of communication, address, and any other information). Further detail about subscriber profiles is provided below in reference to FIG. 3.

In one or more embodiments, the classifier engine (114) includes functionality to extract key terms and obtain contexts for a posting, select a company channel from the channel repository (116) corresponding to the key terms and context, and present, via the subscriber interface (112), the posting to one or more subscribers of the company channel. In one or more embodiments, key terms include individual words, phrases, or other content within the posting. Context is metadata about the posting, such as location of the user performing the posting, the person or machine specifying the posting, the time of the posting or other metadata about the posting. Further, the classifier engine (114) includes functionality to consolidate and/or subdivide company channels. For example, when multiple subscribers specify the same or similar set of subscription terms, the classifier engine may consolidate the company channels created from the same or similar set of subscription terms. Further, a subscriber may request certain postings from a company channel not be presented to them (i.e., "Houston" postings without "business" keywords).

In one or more embodiments, the channel repository (116) stores data corresponding to information defining company channels. Specifically, each company channel in the channel repository (116) stores a set of posting identifiers of postings with key term labels and context labels that match or are related to the channel category of the company channel. Each company channel may include a channel category that broadly describes a set of postings. Specifically, the channel category describes one aspect of a set of postings (e.g., a "Houston" category, a "on-site operations" category, etc.). A single posting may be described by more than one channel category. Further, each company channel may include a set of subscriber identifiers that uniquely identify the subscribers of the company channel.

The following is a discussion of how company channels may be generated. In one or more embodiments, a subscriber may issue one or more subscription terms to the system. The system generates a company channel with the one or more subscription terms. In one or more embodiments, before or after generating the company channel, the system may determine whether one or more other similar company channels exist. If one or more other similar existing company channels exist, the system may subscribe the subscriber to the existing company channel(s). Prior to subscribing the subscriber to an existing company channel, the system may or may not notify the subscriber and request acceptance of the subscription to the existing company channel.

In one or more embodiments, the system shown in FIG. 1 may be used within the framework of a business entity. The business entity may be a company, a large company, a multinational company, a partnership, a joint venture between two groups, or any other type of business entity. For example, the poster (i.e., person or system submitting the posting) and the subscriber may be employees or components of the same business entity. In such a scenario, embodiments provide a mechanism for sharing information throughout the business entity. Specifically, an employee may subscribe to a company channel about a project from the employee's team, but also, in one or more embodiments, the employee may subscribe to company channels about other projects that the employee may not even be aware. For example, the employee may submit general subscription terms about a field or type of technology. When a posting for another project is submitted that relates to the field or the type of technology, the employee is notified. Thus, embodiments may be used to distribute communications throughout the business entity.

While FIG. 1 show various configuration of components, other configurations may be used without departing from the scope of the claims. For example, various components may be combined to create a single component. As another example, the functionality performed by a single component may be performed by two or more components.

Figure 2:
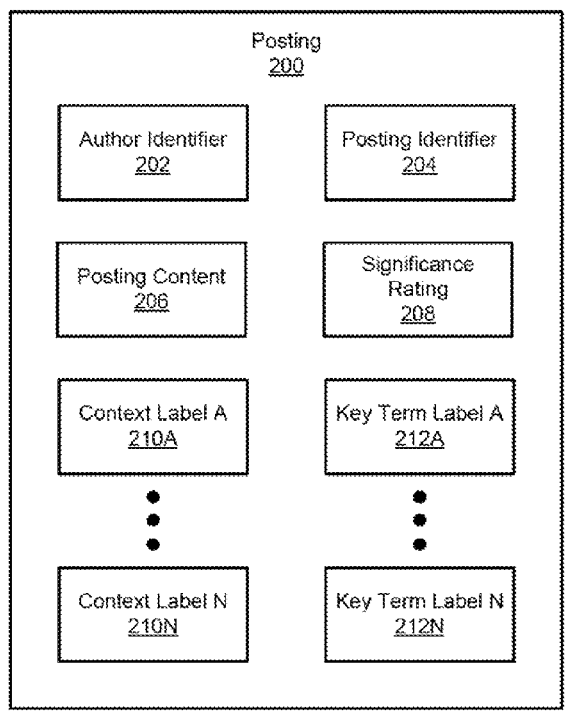

FIG. 2 shows a posting in accordance with one or more embodiments. As shown in FIG. 2, the posting (200) includes an author identifier (202), a posting identifier (204), the posting content (206), a significance rating (208), a set of context labels (context label A (210A), context label N (210N)), and a set of key term labels (key term label A (212A), key term label N (212N)).

In one or more embodiments, the author identifier (202) uniquely identifies the subscriber posting the content and is used to distinguish one author from another. Each posting created by the same author may share the same author identifier (202). In one or more embodiments, the posting identifier (204) uniquely identifies a posting and is used to distinguish one posting from another. The posting identifier (204) may be stored in one or more company channels that match and/or are related to the channel category of the company channel.

In one or more embodiments, the posting content (206) is the media authored by the posting author and submitted for the posting. For example, posting content (206) may include text messages, multimedia, images, audio or any other type of communication. Posting content (206) may be data gathered regarding exploration, drilling, or production operations of an oilfield. The oilfield data may include any data gathered by equipment and other systems. Further, oilfield data may include data that is processed, such as by being preprocessed or interpolated from data gathered directly from the sensors. Further, posting content (206) may be unverified information for internal company use. Such unverified information may include rumors, eye-witness accounts, and other such information that is not verified by another party.

In one or more embodiments, the significance rating (208) is a value indicating the significance of the posting (200). In one or more embodiments, the significance rating (208) is calculated from input from subscribers viewing the posting. Superficially, the subscriber interface of the posting server may provide an option for subscribers to indicate that a posting is significant. The classifier engine may then calculate the significance rating (208) using the amount and/or frequency or the subscriber significance indications.

In one or more embodiments, the significance rating (208) is calculated from context labels included in the posting. Specifically, a context label may indicate a significance value based on the reliability or visibility of the posting author. For example, postings authored by a president of the company may include a context label indicating an initial significance rating (208) for the posting.

In one or more embodiments, the set of context labels (context label A (210A), context label N (210N)) indicate the context applied to the posting. As described above, context labels may be automatically stored with the posting based on, for example, the position of the posting author, the location from which the posting is made, the time the posting is made, or other metadata about the posting.

In one or more embodiments, the set of key term labels (key term label A (212A), key term label N (212N)) store key terms extracted from the posting from the classifier engine. Specifically, each key term label may correspond to a word or phrase used in the posting content that matches and/or is related to at least one channel category.

In one or more embodiments, postings may be connected by including a set of related posting identifiers. In one or more embodiments, postings may be submitted as comments or answers to other postings, and such relationships may be represented using a set of related posting identifiers.

Figure 3:
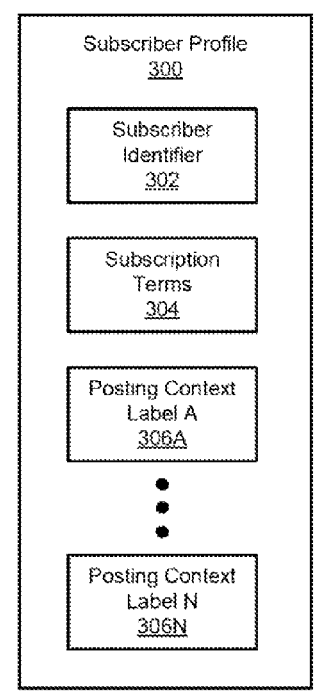

FIG. 3 shows a subscriber profile in accordance with one or more embodiments. As shown in FIG. 3, the subscriber profile (300) includes a subscriber identifier (302), subscription terms (304), and a set of posting context labels (posting context label A (306A), posting context label N (306N)).

In one or more embodiments, the subscriber profile (300) includes information about the employee-subscriber as it relates to the company for which the employee works. The subscriber profile (300) may include the title of the employee, the name of the division or divisions of which the employee is a part, location in which the subscriber is generally located or operates for the company, company projects in which the subscriber is a member, sets of tasks that the subscriber is assigned to perform, customers of the company with whom the subscriber interfaces, and/or other terms associated with the employee-subscribers position in the company.

In one or more embodiments, the subscriber identifier (302) uniquely identifies a subscriber and is used to distinguish one subscriber from another. In one or more embodiments, the subscriber identifier (302) is substantially similar to the author identifier for the subscriber.

In one or more embodiments, the subscription terms (304) describe the company channels that the subscriber is to receive. In one or more embodiments, the subscription terms (304) are automatically generated based on the title of the subscriber-employee of the company. In one or more embodiments, the subscription terms (304) are selected by the subscriber based on their interests. Further, the subscription terms (304) may also describe filters that exclude so posts of a company channel from being presented to that subscriber.

In one or more embodiments, the subscription terms (304) include key terms automatically added based on the employee-subscriber profile (300). Such automatically added subscription terms (304) may be related to the title of the employee, the name of the division or divisions of which the employee is a part, and/or other terms associated with the employee-subscribers position in the company. In other words, because subscription terms define from which company channel a subscriber receives postings and the subscription terms may be automatically added, a subscriber may be automatically added to a company channel based on the subscriber information. By automatically adding subscribers based on information about the subscriber, the subscriber does not need to perform any action to receive relevant postings from others.

In one or more embodiments, company channels may be dynamically created based on subscription terms submitted (304) by the subscriber. For example, the posting server may receive subscription terms (304) from a subscriber and determine whether the number of postings in the posting repository described by the subscription terms exceeds a threshold. Based on the comparison between the number of postings and the threshold, the posting server may generate a new company channel for the subscription terms.

In one or more embodiments, the set of posting context labels (posting context label A (306A), posting context label N (306N)) describe the context labels that are automatically applied to postings authored by the subscriber (assuming the subscriber is also a posting author). The posting context labels (posting context label A (306A), posting context label N (306N)) may be based on the position of the author, the historical reliability of the author, or other static data about the author.

Figure 4:
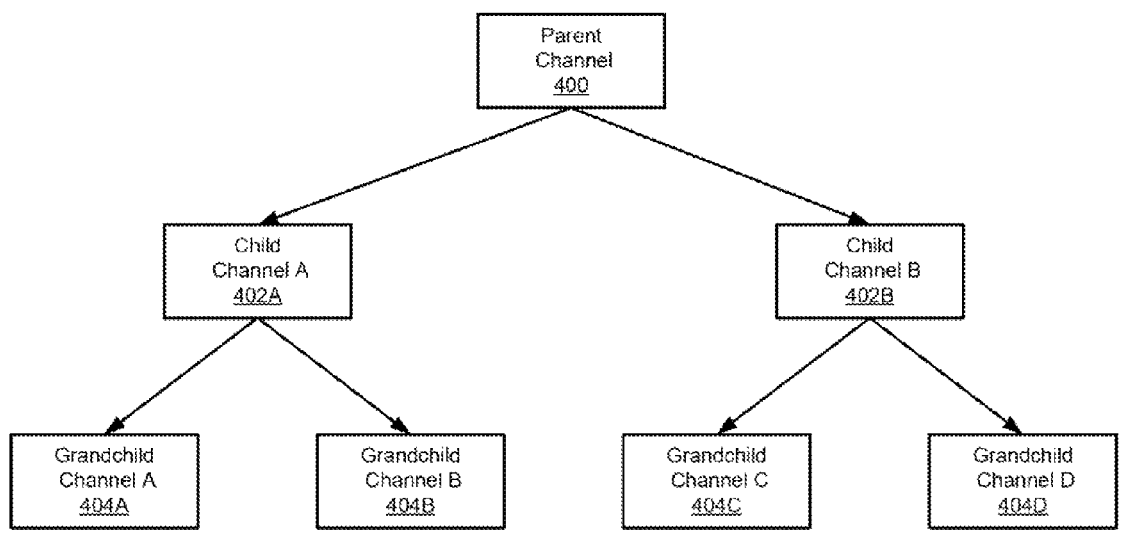

FIG. 4 shows an example of channel relationships in accordance with one or more embodiments. As shown in FIG. 4, the parent channel (400) has two child channels (child channel A (402A), child channel B (402B)). Child channel A (402A) has two child channels (grandchild channel A (404A), grandchild channel B (404B)), and child channel B (402B) has two child channels (grandchild channel C (404C), grandchild channel D (404D)).

In one or more embodiments, the child channels (child channel A (402A), child channel B (402B)) and grandchild channels (grandchild channel A (404A), grandchild channel B (404B), grandchild channel C (404C), grandchild channel D (404D)) have channel categories that are subcategories of the channel category of the parent channel (400). In one or more embodiments, each channel may include any number of child channels and grandchild channels. A subscription to a channel may include the postings from child channels, grandchild channels, and any further subdivisions. For example, a subscription to postings with context labels and/or key terms labels that match "Texas" may include postings with context labels and/or key terms labels that match "Houston," "Dallas," and "Austin." Further, a subscription to postings with context labels and/or key terms labels that match "Middle East" may include postings with context labels and/or key terms labels that match "Saudi Arabia" and "Qatar," and may also include postings with context labels and/or key terms labels that match "Jeddah" and "Doha."

Figure 5:
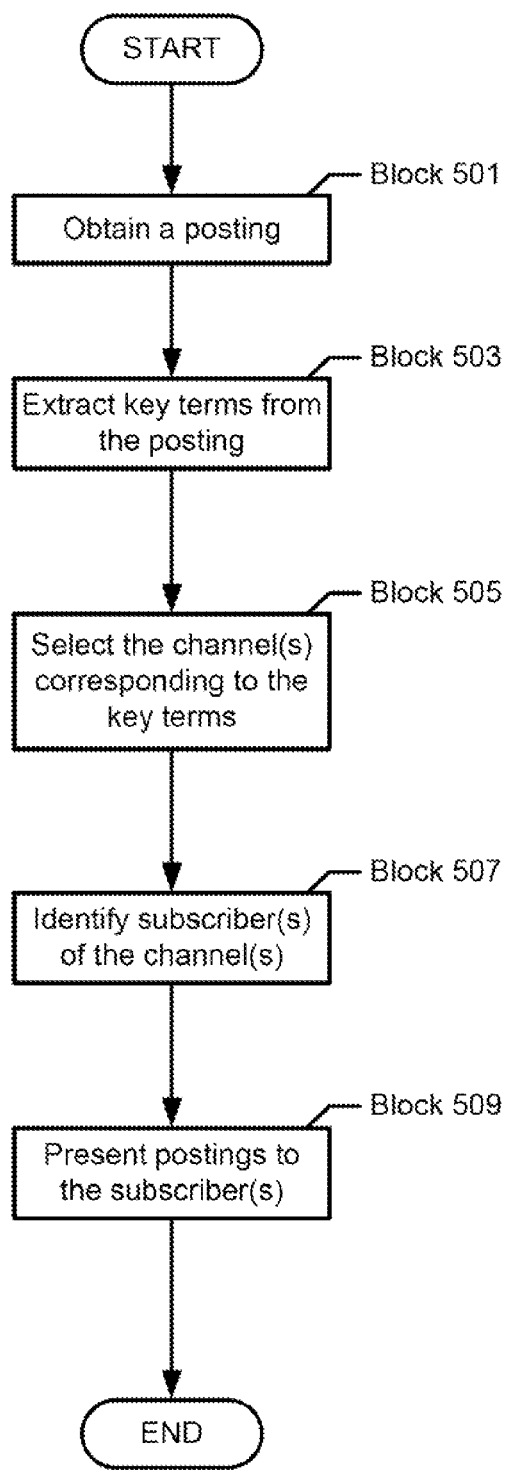
FIGS. 5-7 show flowcharts in accordance with one or more embodiments.

FIG. 5 shows a flowchart for generating a posting and presenting the posting to subscribers in one or more embodiments. While the various blocks in this flowchart are presented and described sequentially, one of ordinary skill will appreciate that some or all of the blocks may be executed in different orders, may be combined or omitted, and some or all of the blocks may be executed in parallel. Furthermore, the blocks may be performed actively or passively.

In Block 501, a postings are obtain in one or more embodiments. Specifically, the obtained posting may include data that is directly or indirectly gathered from one or more posters of that particular company channel. Further, the postings may be acquired from people or generated by systems (e.g., automated postings, group postings, etc). For example, a person may identify a point of interest and submit the posting or a system may self-generate the posting. In one or more embodiments, the posting does not include any identifier of the company channel. Specifically, the posting is directed to a general inbox for the system.

In Block 503, key terms are extracted from the posting in one or more embodiments. For example, the posting may be parsed to identify the key terms. Further, in one or more embodiments, context information about the posting may be gathered.

In Block 505, one or more company channels corresponding to the key terms are selected in accordance with one or more embodiments. Specifically, company channels having subscription terms that match the key terms and context are identified. In one or more embodiments, the match does not require a perfect match. For example, if a threshold number or percentage of the key terms match, then the company channel is selected.

In Block 507, subscribers of the company channel are identified in one or more embodiments. In one or more embodiments, the subscribers of the company channel may be identified based on the subscriber's profile. Specifically, the subscriber profiles of the subscribers may be searched to determine which employee-subscribers subscribe to the company channel. In one or more embodiments, the company channel stored in the channel repository may include subscriber identifiers of the employee-subscribers of the company channel.

In Block 509, the postings are presented in one or more embodiments. For example, the postings may be sent to and displayed on the subscriber's computing device. For example, a set of unread postings may be displayed to an employee-subscriber in an email digest, a feed reader, or any other visual display of posting content. Further, postings may be pushed from the posting server to the employee-subscriber as the postings are added to the posting server.

Figure 6:
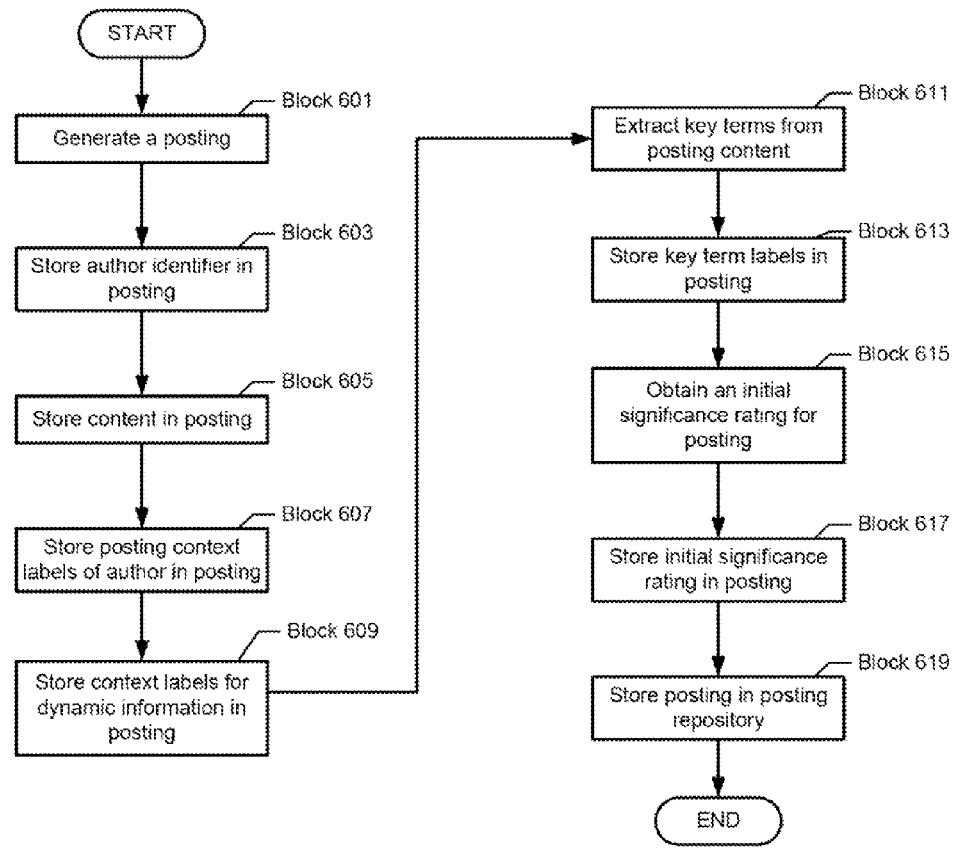

FIG. 6 shows a flowchart for generating a posting in accordance with one or more embodiments. Specifically, FIG. 6 shows details described in Blocks 501 and 503 in FIG. 5. While the various blocks in this flowchart are presented and described sequentially, one of ordinary skill will appreciate that some or all of the blocks may be executed in different orders, may be combined or omitted, and some or all of the blocks may be executed in parallel. Furthermore, the blocks may be performed actively or passively.

In Block 601, the posting server generates a posting. In one or more embodiments, a posting is a data item that stores the posting content and other describing the posting. In Block 603, the posting server stores the author identifier in the posting. In Block 605, the posting server stores the posting content in the posting.

In Block 607, the posting server stores the posting context labels of the posting subscriber in the posting. In one or more embodiments, the posting context labels include static information related to and/or based upon the creator of the posting. In Block 609, the posting server stores context labels for dynamic information in the posting. In one or more embodiments, Block 609 includes determining certain metadata to include in the context labels, such as current location or time of day. The metadata is then stored in the posting as context labels.

In Block 611, the posting server extracts key terms from the posting content. In one or more embodiments, extracting key terms may include resolving misspelled words or alternative spellings of words. Further, extracting key terms may include determining whether the content includes terms that are closely related to key terms used for channel categories. In Block 613, the posting server stores the key term labels in the posting.

In Block 615, the posting server obtains an initial significance score for the posting. In one or more embodiments, the initial significance score may be determined based on posting context labels stored in the posting. In one or more embodiments, the initial significance score may be based on dynamic information in the context labels. For example, an activity may be sufficiently important to a company such that all postings generated at the location of the activity are given elevated initial significance ratings (e.g., the site of an experimental well, a conference, a shareholder's meeting, etc.). In Block 617, the posting server stores the initial significance rating in the posting. In Block 619, the posting server stores the posting in the posting repository.

Figure 7:
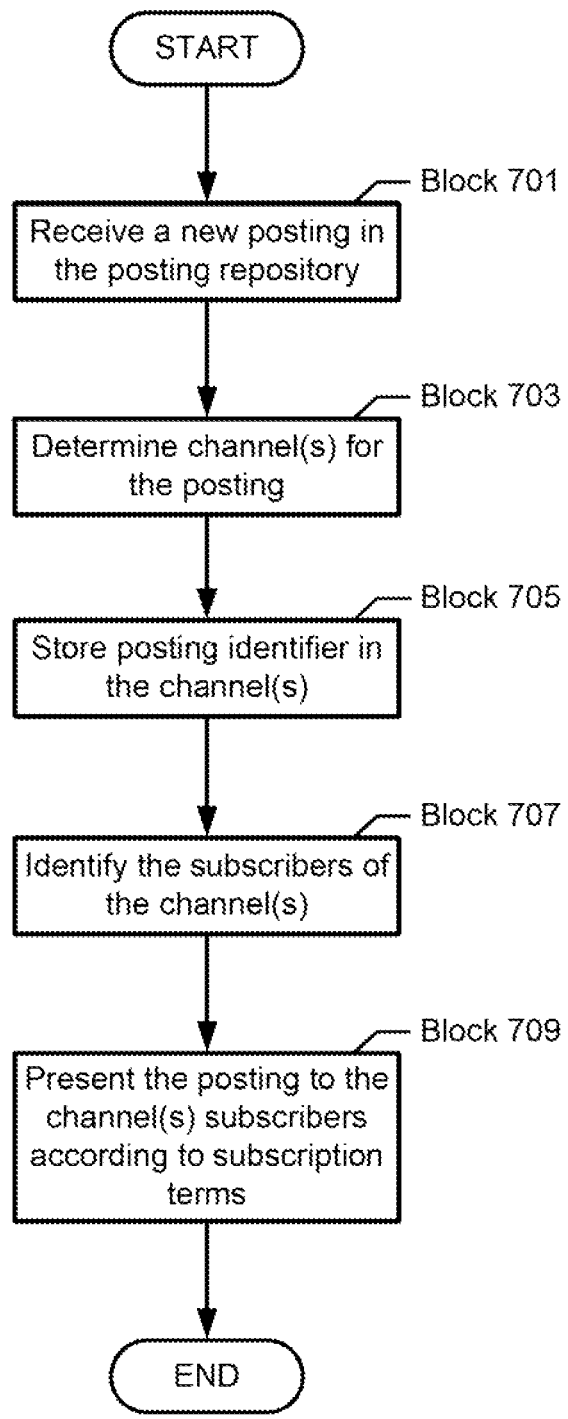

FIG. 7 shows a flowchart for presenting a posting in accordance with one or more embodiments. Specifically, FIG. 7 shows details described in Blocks 505, 507, and 509 in FIG. 5. While the various blocks in this flowchart are presented and described sequentially, one of ordinary skill will appreciate that some or all of the blocks may be executed in different orders, may be combined or omitted, and some or all of the blocks may be executed in parallel. Furthermore, the blocks may be performed actively or passively.

In Block 701, the classifier engine receives a new posting in the posting repository. In one or more embodiments, the classifier engine detects that a new posting has been stored in the posting repository (i.e., as described in Block 619 of FIG. 6). In Block 703, the classifier engine determines the company channels for the posting. In one or more embodiments, determining the company channels for the posting includes matching context labels and key term labels to company channel categories. In Block 705, the classifier engine stores the posting identifier in the company channel or company channels that match the context labels and/or key term labels.

In Block 707, the classifier engine identifies the subscribers of the company channel. In one or more embodiments, the channel subscribers are identified using subscriber identifiers stored in the company channel. In one or more embodiments, the company channel subscribers are identified using subscription terms stored in the subscriber profiles in the subscriber profile repository. In Block 709, the classifier engine presents the postings to the company channel subscribers according to the subscription terms of that subscriber.

The following is for example purposes and not intended to limit the scope of the claims. In the following example, consider the scenario in which three subscribers exist: Jeffrey, Jane, and Joe who work for Oilco, an oilfield services company. Jeffrey is in the marketing department of Oilco and has submitted subscription terms for any customer in the Houston area. Jane is a project manager in Atlanta working on the development of SIMSOFT, Oilco's simulator software. Jane submits subscription terms identifying SIMSOFT and SIMApp products, where SIMApp is a competitor's product. Joe is a developer for Oilco and creates extensions to SIMSOFT for customer X. Joe enters subscription terms of SIMSOFT and customer X. For each subscriber, a separate company channel is created.

Continuing with the example, Jill, a marketing specialist is at customer X in its Houston location. While there, Jill notices that Bob Smith entered customer X holding a set of pamphlets about SIMApp. Jill immediately generates a posting with the posting content "Bob Smith at customer X with SIMApp pamphlets." Jill does not identify any of the company channels or any further information regarding the postings. Because the system detects that Jill is in Houston and has identified customer X in the posting, the posting is sent to Jeffrey. Because SIMApp is a key term in the posting and it matches Jane's key term of SIMApp, the posting is sent to Jane. Because customer X is a key term in the posting and it matches Joe's key term of customer X, the posting is sent to Joe. As shown by way of the example, one or more embodiments provide a mechanism to collaborate between various individuals and systems using postings without requiring that the poster specify the company channel in which postings are posted.

Figure 8:
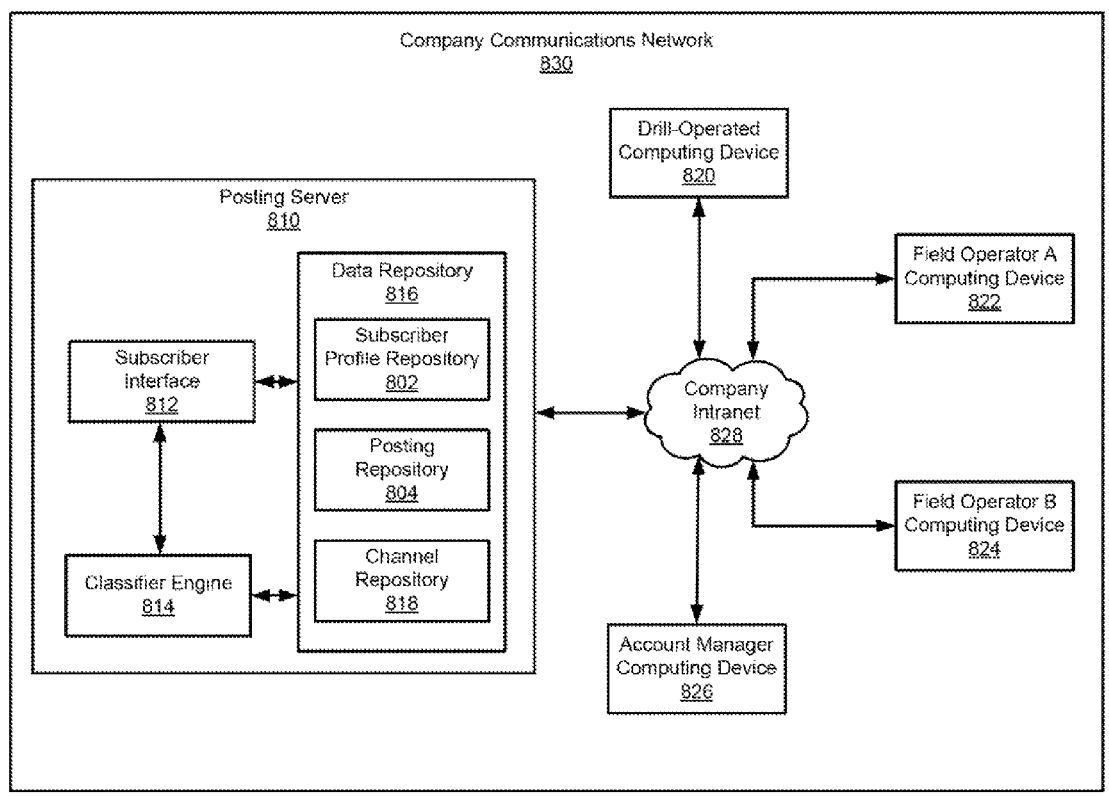
FIG. 8 shows an example in accordance with one or more embodiments.

FIG. 8 shows another example in accordance with one or more embodiments. As shown in FIG. 8, the example posting server (810) includes a subscriber interface (812), a classifier engine (814), and a data repository (816). The data repository (816) includes a subscriber profile repository (802), a posting repository (804), and a channel repository (816). The example includes four subscribers utilizing the posting server (810). The subscribers include a drill device, field operator A, field operator B, and an account manager for Ajax bits. The drill device operates the drill-operated computing device (820), field operator A operates the field operator A computing device (822), field operator B operates the field operator B computing device (824), and the account manager operates the account manager computing device (826).

According to the example, the drill-operated computing device (820) submits "Ajax bit failed at 1000 meters and 120 degrees with 500 rpms" as posting content to the posting server. The posting is generated by the posting server (810) with the location of the drill device as a context label. A posting identifier for the posting is then stored in the company channels for "drill bit" and "Ajax."

Field operator A computing device (822) submits "Another Ajax failed ~950 m/130 deg/~600 rpms" as posting content to the posting server. The posting is generated by the posting server (810) with the location of field operator A as a context label. A posting identifier for the posting is then also stored in the company channels for "drill bit" and "Ajax."

The two postings are then presented to Field operator B who is a subscriber to the company channel "drill bits". Based on the information, field operator B slows the Ajax bit on her system to avoid a failure. Field operator B does avoid failure and submits the posting content "Ajax works here at 1500 m/110 deg/200 rpms." The posting is generated by the posting server (810) with the location of field operator B as a context label. The posting may also include a reference to the other related postings. A posting identifier for the posting is then stored in the company channels for "drill bit" and "Ajax."

The three postings are presented, via the account manager computing device (826), to the account manager who is a subscriber to the "Ajax" company channel. Based on the postings, the account manager contacts "Ajax" to notify them of a potential defect in their drill bit.

Figure 9:
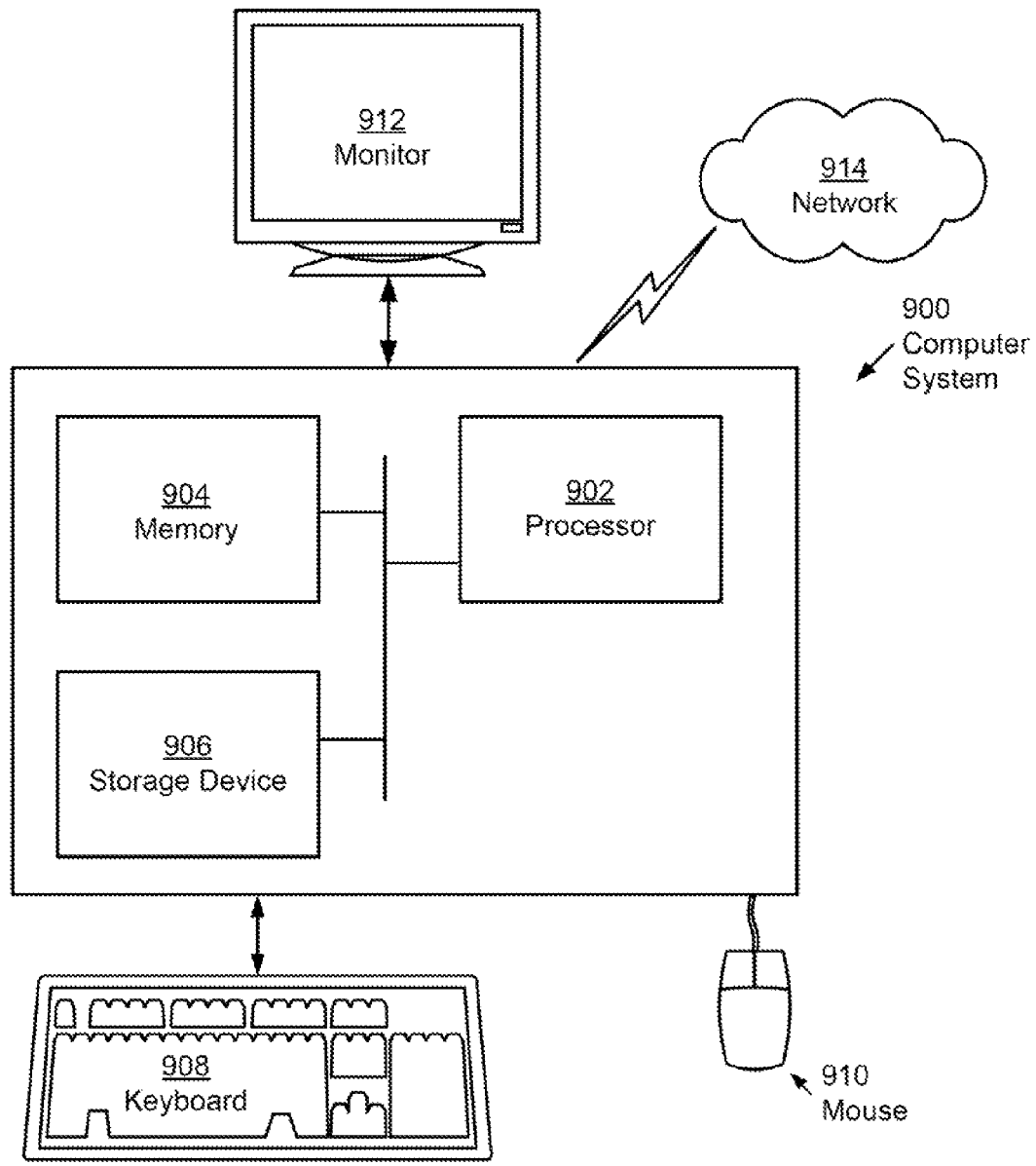
FIG. 9 shows a computer system in accordance with one or more embodiments.

Embodiments may be implemented on virtually any type of computer system (i.e., computing device) regardless of the platform being used. For example, as shown in FIG. 9, a computer system (900) includes one or more computer processor(s) (902), associated memory (904) (e.g., random access memory (RAM), cache memory, flash memory, etc.), a storage device (906) (e.g. a hard disk, an optical drive such as a compact disk drive or digital versatile disk (DVD) drive, a flash memory stick, etc.), and numerous other elements and functionalities typical of today's computers (not shown). In one or more embodiments, the processor (902) is hardware. For example, the processor may be an integrated circuit. The computer system (900) may also include input means, such as a keyboard (908), a mouse (910), or a microphone (not shown). Further, the computer system (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other type of network) via a network interface connection (not shown). Many different types of computer systems exist, and the aforementioned input and output means may take other forms. Generally speaking, the computer system (900) includes at least the minimal processing, input, and/or output means necessary to practice embodiments.

Software instructions in the form of computer readable program code to perform embodiments may be stored, in whole or in part, temporarily or permanently, on a computer readable medium such as a compact disc (CD), a diskette, a tape, physical memory, or any other computer readable storage medium. Specifically, the software instructions may correspond to computer readable program code that when executed by a processor(s), is configured to perform embodiments. In one or more embodiments, the computer readable medium is a non-transitory computer readable medium.

Further, one or more elements of the aforementioned computer system (900) may be located at a remote location and connected to the other elements over a network. Further, embodiments may be implemented on a distributed system having a plurality of nodes, where each portion of one or more embodiments may be located on a different node within the distributed system. In one or more embodiments, the node corresponds to a computer system. The node may correspond to a processor with associated physical memory. The node may also correspond to a processor or micro-core of a processor with shared memory and/or resources.

While the above description includes a limited number of embodiments, those skilled in the art, having benefit of this disclosure, will appreciate that other embodiments can be devised which do not depart from the scope of the claims. Accordingly, the scope of the claims should be limited only by the attached claims.

What is claimed is:

1. A method for remote collaboration, the method comprising:
  receiving, over a computer network, posting content from a drill device in an oilfield managed by a company, wherein the posting content comprises a plurality of key terms and a message specifying a drill bit failure;
  generating a posting using the posting content;
  extracting the plurality of key terms from the posting content;
  matching one of the plurality of key terms to a key term label;
  storing the key term label in the posting;
  selecting a company channel corresponding to the key term label by:
    receiving, from a subscriber, a set of subscription terms,
    matching the set of subscription terms to the key term label,
    determining a number of postings comprising the key term label exceeds a threshold,
    generating, in response to determining the number of postings exceeds the threshold, the company channel based on the subscription terms, and
    subscribing the subscriber to the company channel; and
  sending, in response to the subscriber being subscribed to the company channel, the posting content over the computer network to a field operator computing device operated by the subscriber,
  wherein the subscriber is a field operator of the company, and wherein the field operator slows a drill bit in response to the posting content to avoid failure of the drill bit.

2. The method of claim 1, wherein the subscriber is automatically subscribed to the company channel based on an employee title of the subscriber.

3. The method of claim 1, further comprising:
receiving, by the field operator computing device, a plurality of postings,
wherein the plurality of postings comprises the posting, and
wherein each of the plurality of postings comprises the key term label.

4. The method of claim 1, wherein a channel category of the company channel is associated with an employment position of the subscriber.

5. The method of claim 1, wherein the company channel is further selected based on a context associated with the posting, and wherein the context is generated based on dynamic information about the posting content.

6. A non-transitory computer readable medium comprising instructions that, when executed by a computer processor, perform a method for remote collaboration, the method comprising:
receiving, over a computer network, posting content from a drill device in an oilfield managed by a company, wherein the posting content comprises a plurality of key terms and a message specifying a drill bit failure;
generating a posting using the posting content;
extracting the plurality of key terms from the posting content;
matching one of the plurality of key terms to a key term label;
storing the key term label in the posting;
selecting a company channel corresponding to the key term label by:
receiving, from a subscriber, a set of subscription terms,
matching the set of subscription terms to the key term label,
determining a number of postings comprising the key term label exceeds a threshold,
generating, in response to determining the number of postings exceeds the threshold, the company channel based on the subscription terms, and
subscribing the subscriber to the company channel; and
sending, in response to the subscriber being subscribed to the company channel, the posting content over the computer network to a field operator computing device operated by the subscriber,
wherein the subscriber is a field operator of the company, and
wherein the field operator slows a drill bit in response to the porting content to avoid failure of the drill bit.

7. The non-transitory computer readable medium of claim 6, wherein the subscriber is automatically subscribed to the company channel based on an employee title of the subscriber.

8. The non-transitory computer readable medium of claim 6, the method further comprising:
receiving, by the field operator computing device, a plurality of postings,
wherein the plurality of postings comprises the posting, and
wherein each of the plurality of postings comprises the key term label.

9. The non-transitory computer readable medium of claim 6, wherein a channel category of the company channel is associated with an employment position of the subscriber.

10. The non-transitory computer readable medium of claim 6, wherein the company channel is further selected based on a context associated with the posting, and wherein the context is generated based on dynamic information about the posting content.

11. A system for remote collaboration, the system comprising:
a storage device storing a subscriber profile for a subscriber of a company channel; and
a classifier engine comprising circuitry configured to:
receive, over a computer network, posting content from a drill device in an oilfield managed by of a company, wherein the posting content comprises a plurality of key terms and a message specifying a drill bit failure;
generate a posting using the posting content;
extract the plurality of key terms from the posting content;
match one of the plurality of key terms to a key term label;
store the key term label in the posting;
select the company channel corresponding to the key term label by:
receiving, from a subscriber, a set of subscription terms,
matching the set of subscription terms to the key term label,
determining a number of postings comprising the key term label exceeds a threshold,
generating, in response to determining the number of postings exceeds the threshold, the company channel based on the subscription terms, and
subscribing the subscriber to the company channel; and
send, in response to the subscriber being subscribed to the company channel, the posting content over the computer network to the field operator computing device operated by the subscriber,
wherein the field operator slows a drill bit in response to the posting content to avoid failure of the drill bit.

12. The system of claim 11, wherein the subscriber is automatically subscribed to the company channel based on an employee title of the subscriber.

13. The system of claim 11, wherein a channel category of the company channel is associated with an employment position of the subscriber.

14. The system of claim 11, wherein the company channel is further selected based on a context associated with the posting, and wherein the context is generated based on dynamic information about the posting content.

* * * * *